United States Patent [19]

Huang

[11] Patent Number: 5,443,342
[45] Date of Patent: Aug. 22, 1995

[54] DEVICE FOR POSITIONING CARGO

[76] Inventor: Han-Ching Huang, No. 12, Avenue 111, Lane 437, Jeng Hsin Road, Taichung, Taiwan

[21] Appl. No.: 212,357

[22] Filed: Mar. 14, 1994

[51] Int. Cl.⁶ .................. B60P 7/15; B61D 45/00
[52] U.S. Cl. ................. 410/151; 410/143; 74/142; 254/95; 254/247
[58] Field of Search .................. 410/143–145, 410/151; 74/141.5, 142, 155, 169; 254/12, 95, 108, 230, 247

[56] References Cited

U.S. PATENT DOCUMENTS

| | | | |
|---|---|---|---|
| 529,929 | 11/1894 | Marston | 254/12 X |
| 1,135,299 | 4/1915 | Larsen | 254/95 X |
| 3,049,328 | 8/1962 | Bishop | 410/151 X |
| 3,053,508 | 9/1962 | Schultz | 74/155 X |
| 4,396,325 | 8/1983 | Joice-Cavanagh | 410/151 X |
| 4,669,934 | 6/1987 | Wisecarver | 410/145 X |
| 4,781,499 | 11/1988 | Wisecarver | 410/151 |

FOREIGN PATENT DOCUMENTS 404745 12/1990 European Pat. Off. ............ 410/143

Primary Examiner—Michael S. Huppert
Assistant Examiner—Stephen Gordon
Attorney, Agent, or Firm—Charles E. Baxley

[57] ABSTRACT

A device for positioning cargo includes a rack slidably engaged in a tube and outstretched from the tube so as to force against the cargo in order to position the cargo within a container, a base is secured to the tube, a ratchet gear is rotatably supported in the base and engaged with the rack, a handle is pivotally coupled to the base and has a catch engaged with the ratchet gear, the rack can be easily and quickly outstretched from the tube when the handle is rotated in a reciprocating action.

3 Claims, 3 Drawing Sheets

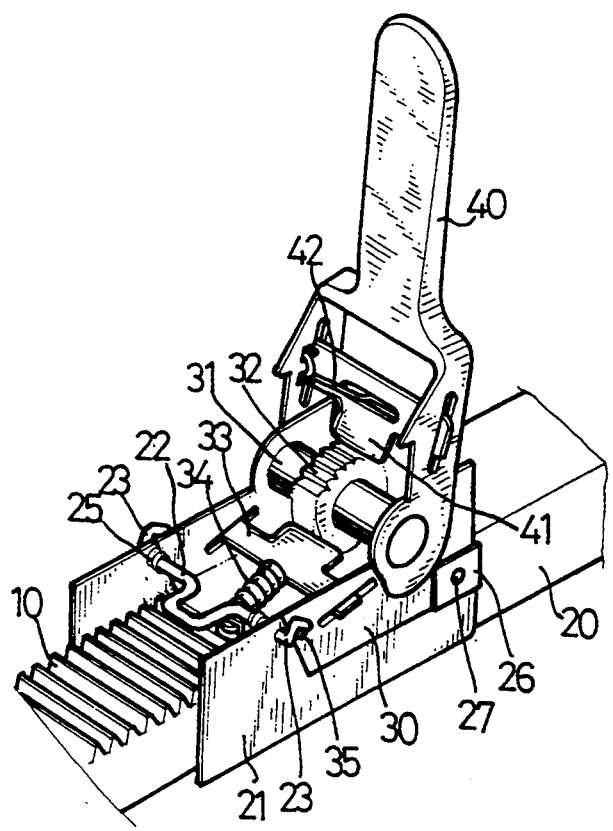
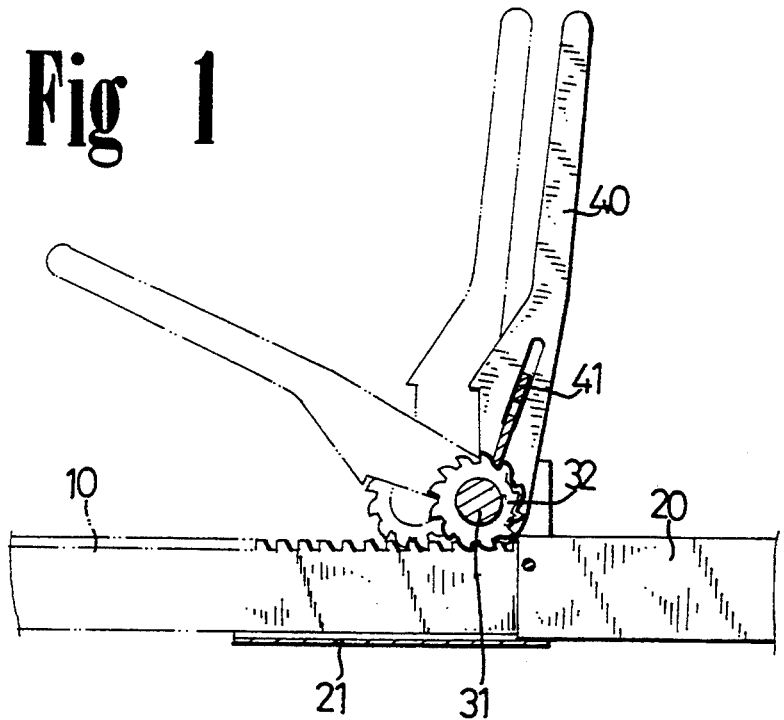
Fig 1
Fig 3

DEVICE FOR POSITIONING CARGO

BACKGROUND OF THE INVENTION

1. Field of the Invention

The present invention relates to a positioning device, and more particularly to a device for positioning cargo.

2. Description of the Prior Art

A typical container 90 is shown in FIG. 4 and provided for accommodating cargo 91, in order to position the cargo, a number of positioning devices 92 are provided to force against the cargo 91, as shown in FIG. 5, the positioning device 92 includes a tube 94 having a rod 95 slidably engaged therein, a sleeve 96 secured on one end of the tube 94, a rack 97 having one end fixed to the rod 95 and having the other end disposed above the tube 94, a handle 98 pivotally coupled to the sleeve 96 and including a number of teeth 99 for engaging with the rack 97, the tube 94 and the rod 95 can be outstretched or expanded so as to be fixed within the container 90 for forcing against the cargo 91 and can be fixed together by engagement between the teeth 99 and the rack 97; however, the rack 97 and the tube 94 can be moved for only about two teeth distance, such that the rod 95 should be moved relative to the tube 94 to a suitable place before the handle 98 can be operated. This is inconvenient.

The present invention has arisen to mitigate and/or obviate the afore-described disadvantages of the conventional positioning devices for cargo.

SUMMARY OF THE INVENTION

The primary objective of the present invention is to provide a device which may firmly apply a force against the cargo so as to solidly retain the cargo in place.

In accordance with one aspect of the invention, there is provided a device for positioning cargo comprising a tube, a rack slidably engaged in the tube, a base secured to the tube, a shaft pivotally supported in the base, a ratchet gear fixed on the shaft and engaged with the rack so as to outstretch the rack from the tube when the ratchet gear rotates in an active direction, stop means disposed in the base for engaging with the ratchet gear so as to prevent the ratchet gear from rotating in a reverse direction, a handle pivotally coupled to the shaft, and catch means disposed in the handle for engaging with the ratchet gear so as to rotate the ratchet gear when the handle rotates in the active direction, whereby, the rack is outstretched from the tube when the handle is rotated in a reciprocating action.

The stop means includes a stop slidably engaged in the base, and means for biasing the stop to engage with the ratchet gear. The catch means includes a catch slidably engaged in the handle, and means for biasing the catch to engage with the ratchet gear.

A sleeve may further be secured to the tube, the base is pivotally coupled to the sleeve at a pivot pin and includes projection means, a hook means coupled to the sleeve for engaging with the projection means so as to retain the base in place relative to the sleeve, and the base is rotatable about the pivot pin when the hook means is disengaged from the projection means. The hook means includes a rod rotatably supported in the sleeve, the rod includes at least one end extended outward of the sleeve and having a hook formed thereon for engaging with the projection means, the rod includes a middle portion having a hand grip formed thereon for rotating the rod so as to disengage the hook from the projection means.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a perspective view of a positioning device in accordance with the present invention;

FIG. 3 is a cross sectional view of the positioning device;

DETAILED DESCRIPTION OF THE PREFERRED EMBODIMENT

Figure 2:
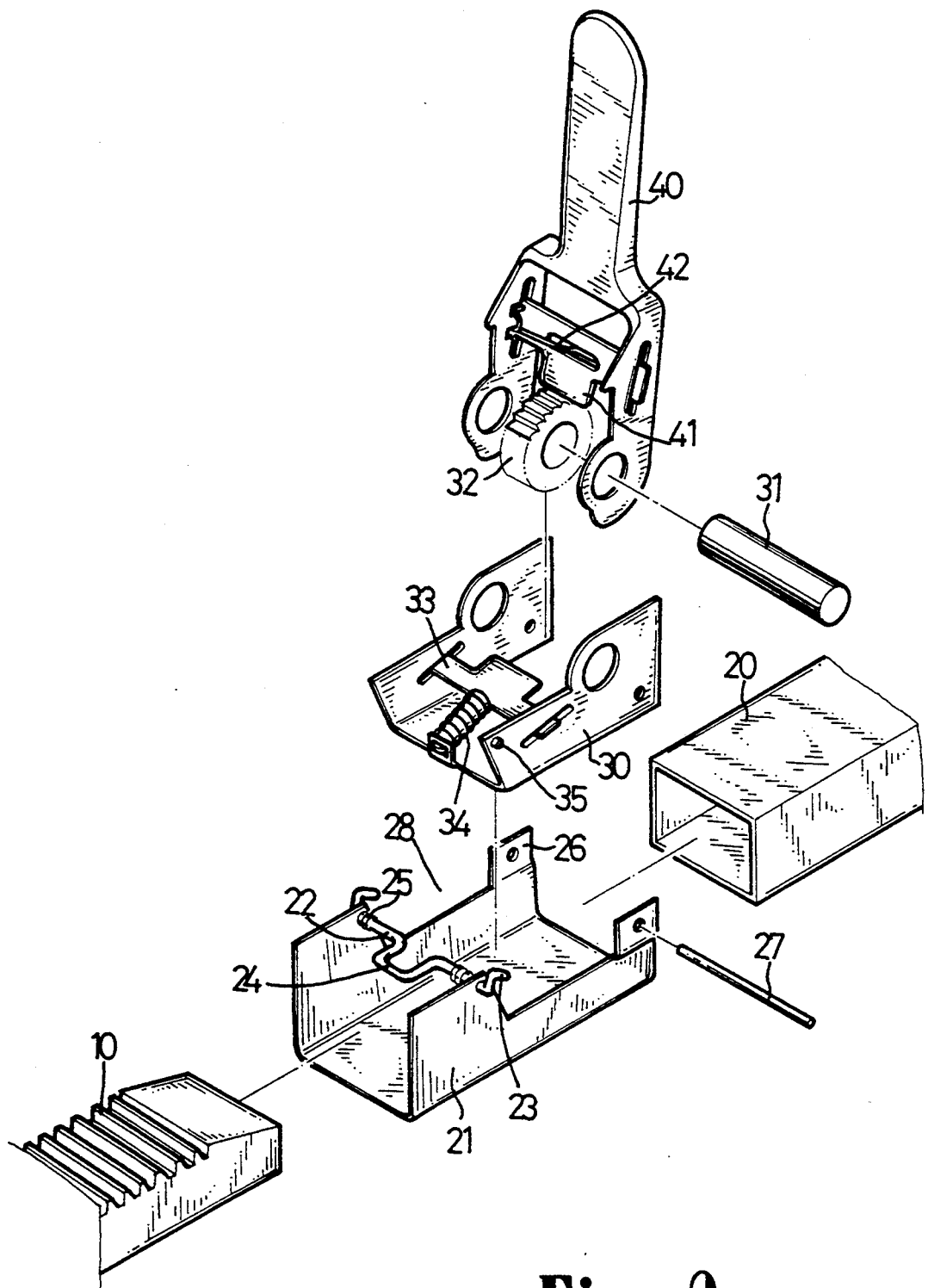
FIG. 2 is an exploded view of the positioning device.
Figure 5:
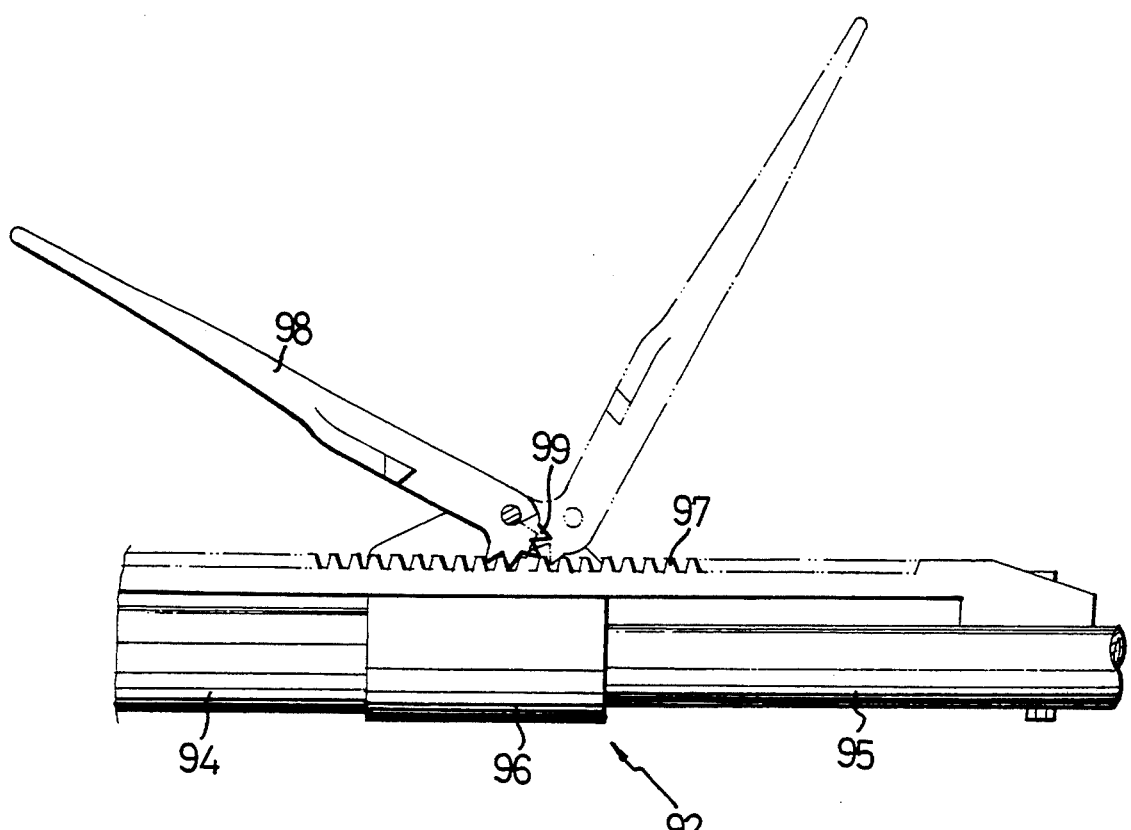
FIG. 5 is a cross sectional view illustrating a typical positioning device for cargo.
Figure 4:
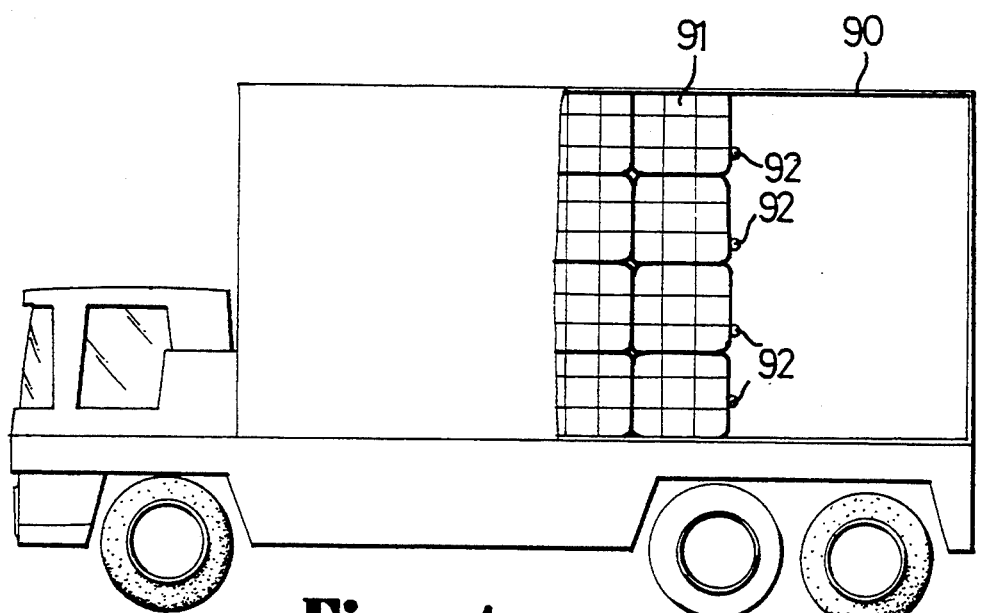
FIG. 4 is a partial cross sectional view of a typical truck.

Referring to FIGS. 1 to 3, a positioning device in accordance with the present invention comprises a rack 10 slidably engaged in a tube 20, a sleeve 21 fixed to one end of the tube 20 by welding processes or formed integral with the tube 20, two openings 28 formed in two side portions of the sleeve 21, two ears 26 extended from the sleeve 21 for supporting a pivot pin 27, a rod 22 rotatably supported in the sleeve 21 and including two ends extended outward of the sleeve 21 and having two hooks 23 formed thereon, a spring 25 engaged on the rod 22 for biasing the hooks 23 toward the ears 26, a hand grip 24 formed in the middle portion of the rod 22 for rotating the rod 22.

A base 30 is engaged with the openings 28 of the sleeve 21 and includes one end pivotally coupled to the sleeve 21 at the pivot pin 27, a shaft 31 rotatably supported in the base 30, a ratchet gear 32 fixed on the shaft 31 and engaged with the rack 10, a stop 33 slidably engaged in the base 30, a spring 34 engaged between the stop 33 and the base 30 for biasing the stop 33 to engage with the ratchet gear 32 so as to prevent the ratchet gear 32 from rotating in a reverse direction, and two projections 35 extended outward from the base 30 for engaging with the hooks 23 such that the base 30 can be secured to the sleeve 21, the base 30 may be rotated about the pivot pin 27 when the hooks 23 are disengaged from the projections 35. A handle 40 includes one end rotatably engaged on the shaft 31, a catch 41 is slidably engaged in the handle 40, and a spring 42 is biased between the catch 41 and the handle 40 for biasing the catch 41 to engage with the ratchet gear 32, such that the ratchet gear 32 can be rotated by the handle 40.

In operation, as shown in FIG. 3, when the handle 40 is rotated clockwise, the ratchet gear 32 can be rotated by the handle 40 such that the rack 10 can be outstretched from the tube 20 so as to force against the cargo, when the handle 40 is rotated in the reverse direction, i.e., the counterclockwise, the stop 33 prevents the ratchet gear 32 from rotating in the reverse direction such that the handle 40 may rotate in the reverse direction relative to the ratchet gear 32, and the rack 10 can further be outstretched from the tube 20 when the handle 40 is rotated clockwise again, such that the rack 10 can be outstretched from the tube 20 in a fast speed.

It is to be noted that the ratchet gear 32 can be disengaged from the rack 10 when the base 30 is rotated about the pivot pin 27 and when the hooks 23 are disengaged from the projections 35, such that the rack 10 can be freely slide relative to the tube 20.

Accordingly, the positioning device in accordance with the present invention includes a rack that can be easily and quickly outstretched from the tube such that the positioning device can be easily fixed in the container, the positioning device can be engaged with the cargo contained in the container so as to retain the cargo in place and so as to prevent the cargo from falling down.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A device for positioning cargo and comprising a tube, a rack slidably engaged in said tube, a base secured to said tube, a shaft pivotally supported in said base, a ratchet gear fixed on said shaft and engaged with said rack so as to outstretch said rack from said tube when said ratchet gear rotates in an active direction, stop means disposed in said base for engaging with said ratchet gear so as to prevent said ratchet gear from rotating in a reverse direction, a handle pivotally coupled to said shaft, and catch means disposed in said handle for engaging with said ratchet gear so as to rotate said ratchet gear when said handle rotates in said active direction, whereby, said rack is outstretched from said tube when said handle is rotated with reciprocating action, a sleeve secured to said tube, said base being coupled pivotally to said sleeve at a pivot pin and including projection means, hook means coupled to said sleeve for engaging with said projection means so as to retain said base in place relative to said sleeve, and said base being rotatable about said pivot pin when said hook means is disengaged from said projection means.

2. A device according to claim 1, wherein said hook means includes a rod rotatably supported in said sleeve, said rod includes at least one end extended outward of said sleeve and having a hook formed thereon for engaging with said projection means, said rod includes a middle portion having a hand grip formed thereon for rotating said rod so as to disengage said hook from said projection means.

3. A device for positioning cargo and comprising a tube, a rack slidably engaged in said tube, a sleeve secured to said tube, a base being pivotally coupled to said sleeve at a pivot pin and including projection means, hook means coupled to said sleeve for engaging with said projection means so as to retain said base in place relative to said sleeve, said hook means including a rod rotatably supported in said sleeve, said rod including at least one end extended outward of said sleeve and having a hook formed there for engaging with said projection means, said rod also including a middle portion having a hand grip formed thereon for rotating said rod so as to disengage said hook from said projection means and said base being rotatable about said pivot pin when said hook means is disengaged from said projection means; a shaft pivotally supported in said base, a ratchet gear fixed on said shaft and engaged with said rack so as to outstretch said rack from said tube when said ratchet gear rotates in an active direction, stop means disposed in said base for engaging with said ratchet gear so as to prevent said ratchet gear from rotating in a reverse direction, a handle coupled pivotally to said shaft, and catch means disposed in said handle for engaging with said ratchet gear so as to rotate said ratchet gear when said handle rotates in said active direction, whereby said rack is outstretched from said tube when said handle is rotated with reciprocating action.

* * * * *